United States Patent [19]

Hill

[11] 3,982,796
[45] Sept. 28, 1976

[54] THRUST BEARINGS
[75] Inventor: Alfred Hill, Abbots Langley, England
[73] Assignee: The Glacier Metal Company Limited, Wembley, England
[22] Filed: Feb. 22, 1974
[21] Appl. No.: 444,698

[30] Foreign Application Priority Data
Feb. 28, 1973 United Kingdom............... 9702/73

[52] U.S. Cl................................. 308/122; 308/172
[51] Int. Cl.² ........................................ F16C 17/06
[58] Field of Search ............ 308/160, 168, 172, 73, 308/2 R, 122, 9

[56] References Cited
UNITED STATES PATENTS

| | | | |
|---|---|---|---|
| 3,291,543 | 12/1966 | Nigh | 308/160 |
| 3,351,394 | 11/1967 | Hooker | 308/122 X |
| 3,625,576 | 12/1971 | Miller et al. | 308/160 X |
| 3,672,733 | 6/1972 | Arsenius et al. | 308/160 X |
| 3,768,377 | 10/1973 | Engel et al. | 308/160 X |
| 3,799,628 | 3/1974 | Gaasbeek et al. | 308/122 X |

*Primary Examiner*—Evon C. Blunk
*Assistant Examiner*—Michael Mar
*Attorney, Agent, or Firm*—Pierce, Scheffler & Parker

[57] ABSTRACT

A multi-pad thrust bearing has the pads mounted on a carrier through a hydrostatic oil pressure cushion regions, the oil in which has been pressurized hydrodynamically by rotation between the pad bearing surfaces and the load surface; the oil is led through the bearing pads to rear cavity where the oil cushion is established.

7 Claims, 6 Drawing Figures

THRUST BEARINGS

The present invention relates to thrust bearings of the kind comprising a pad carrier, for example an annular ring, and an annular series of separate thrust pads the bearing surfaces make up a thrust bearing surface against which in use bears the co-operating annular bearing surface (or load surface) of a relatively rotating member. An object of the invention is to improve the operation of such thrust bearings in which during operation the thrust pads can tilt individually relatively to the carrier.

Such bearing assemblies do have disadvantages associated with manufacturing discrepancies such that the pads do not equally share the load and there may be misalignment problems as well. These disadvantages are more pronounced at high speed and may cause seizure or undue wear on the bearing surfaces of the pads. These disadvantages arise from variations in pad depths, the load surface not running true and the pads being housed at different levels in the carrier due to manufacturing inaccuracies. In known bearings of this type, for example, such as are disclosed in British Patent Specification No. 1,004,733 the pads are located on a carrier ring by pad stops and the pads tilt on the carrier ring about a pivot which takes the form of a radially extending ridge on the undersurface of the pad. Commonly, existing designs of pads have rigid pivots of line or point supporting type and these are subject to fatigue or fretting when subjected to cyclic loading.

According to the invention, a thrust bearing comprises an annular series of thrust pads each having a bearing surface for carrying thrust from a relatively-rotating load surface, and an opposed rear surface supported from a pad carrier, there being a passage through each pad for leading oil pressurized hydrodynamically by rotation between the bearing surface and load surface to a space between the rear surface and the carrier surface where that oil can act to support the pad from the carrier non-positively.

There may be a cavity in the rear surface of each pad defining the said space.

The invention improves the self-aligning and load equalisation operation of the pads thrust bearing, and reduces the risk of pivot fretting. The oil in the rear space acts as a hydrostatic fluid pivot.

The thrust bearing assembly may be immersed in a bath of oil or the oil may be fed under pressure between the load surface and the bearing surfaces of the pads. Conveniently the oil will be supplied through an oil supply opening extending through each pad at a leading edge having regard to the direction of relative rotation and oil will be discharged at the trailing edge. The oil supply openings may terminate in a slot in the pad surface. To suit rotation in either direction it is convenient to arrange oil supply openings at both edges of each pad. The passage through the pad to the rear space for providing fluid support is independent of the oil supply openings and spaced from them.

For bearings which operate against a unidirectionally rotating collar face the inlet edge may have an oil supply passage and groove as described above and a similar groove and passage may be used to collect oil discharged from the pad and pass it to the outlet or drain system.

In addition to the pad having a fluid pivot as previously referred to, the pocket at the back of a pad may also be further connected to another series of pockets at the back of the carrier so that a hydrostatic pressurized fluid support exists for the carrier. By making the supporting surface of spherical form an almost frictionless self-aligning device is formed.

Also the back of each pad may be of spherical form fitting into a spherical recess in the carrier, giving a virtually frictionless pivot able to accommodate great angles to tilt in both radial and circumferential directions.

The invention may be carried into practice in various ways, and two embodiments will now be described by way of example with reference to the accompanying diagrammatic drawings, in which.

Figure 1:
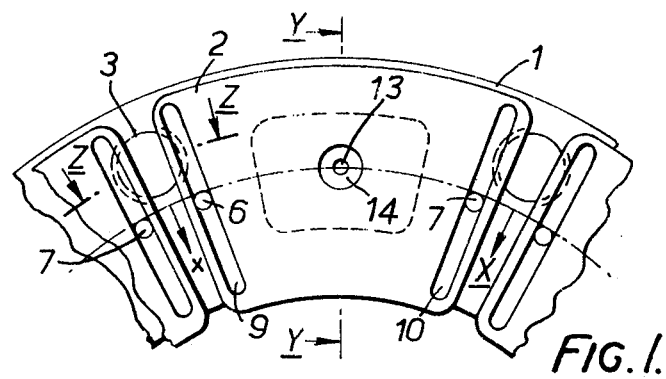
FIG. 1 is a front view of part of one thrust bearing assembly, that is to say a view looking towards the working surfaces of the thrust pads.
Figure 2:
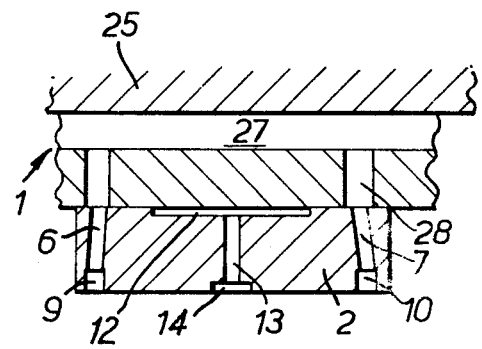
FIG. 2 is a cross-section on the line XX of FIG. 1.
Figure 4:
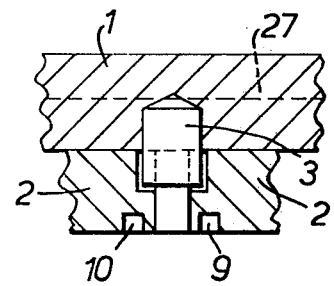
FIG. 4 is a cross-section on the line ZZ of FIG. 1.
Figure 3:
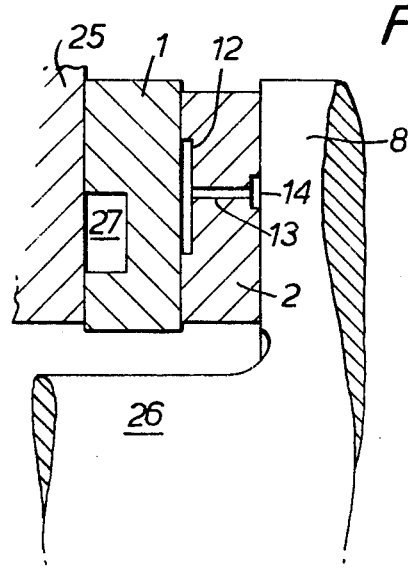
FIG. 3 is a cross-section on the line YY of FIG. 1.

The thrust bearing assembly shown in FIGS. 1 – 4 comprises an annular carrier ring 1 on a supporting member 25 and an annular series of pads 2 for supporting a thrust collar 8 on a shaft 26.

The pads are located on the carrier ring 1 by a series of studs 3, (FIGS. 1 and 4) which fit in bores in the ring 1 and extends above of the surface of the ring 1 so that each engages in two part-cylindrical recesses one in the back of each of two adjacent pads 2, with sufficient clearance to enable the pads to tilt. Each pad is supplied with lubricant from a circumferential duct 27 in the back of the ring 1 by way of passages 28 leading to the front of the ring 1 (FIG. 2) and in inlet holes 6 and 7 which terminate in respective elongated slots 9 and 10 lying near the edges of the working surface of the pad. One or other of the slots 9 and 10 enables oil to be supplied to the working surface of the pads in the region of the leading edge in whichever direction rotation is occurring with small losses due to churning of oil.

The studs 3 are positioned away from the oil passages.

In the centre of the back of each pad 2 there is a recess 12 connected by a passageway 13 through the pad and to a central small recess 14 in the working surface of the pad.

In operation, as the thrust collar 8 rotates relative to the pads 2, the oil supplied to the working surfaces via whichever of the slots 9 and 10 is at the leading edges will have its pressure hydrodynamically increased as it passes over the pad to a maximum pressure. Some of this pressurized oil will pass down through the pocket 14 and passage 13 and into the recess 12 to support the pad hydrostatically in whatever position it requires to tilt dependent upon the operating factors involved. With such a pressurized fluid support, the load on the bearing will be shared by each of the pads substantially equally since the pressures will be substantially the same for each pad. Thus each pad can either have its working surface moved towards the thrust collar by the hydrostatic pressure or will relax away dependent on the pressure balance in the system. Thus increasing hydrodynamic pressure will cause hydrostatic lifting of the pad until a pressure balance is reached and vice versa.

Figure 5:
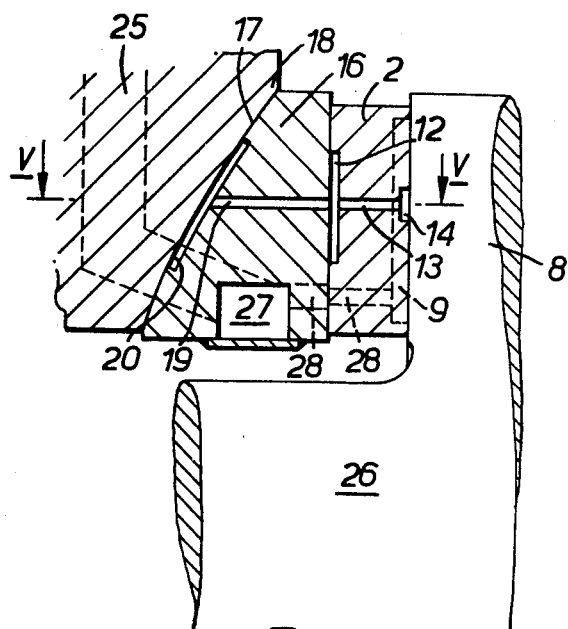
FIG. 5 is a cross-section of a second tilting pad thrust assembly.
Figure 6:
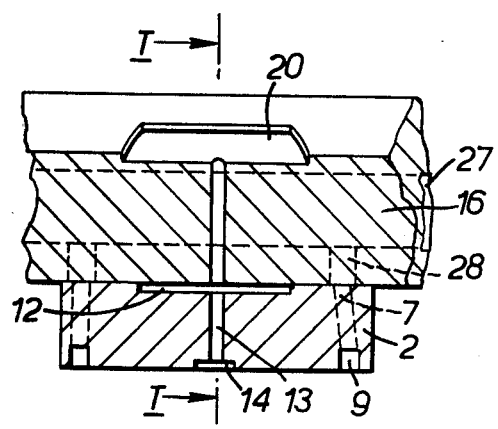
FIG. 6 is a cross-section on the line VV of FIG. 5.

The embodiment of FIGS. 5 and 6 differs in that the ring 16 which supports the pads 2 has a part-spherical rear surface 17 co-operating with a similar surface 18 on the member 25. The pocket 12 communicates through a passage 19 in the ring 16 with a pocket 20 in the spherical surface 17. This allows the carrier ring 16 to float and align itself in a similar manner.

In order to work to its best advantage the pads may have crowned working surfaces, that is to say, that the pads have a slightly curved working surface, being thicker in the centre region. Known thrust bearing assemblies have a pivot in the form of a central ridge radially extending along the centre of a pad segment. It is not possible to have a pivot off-set from the radial centre line and an assembly suitable for both directions of rotation. With the present invention however there is no such restriction as the pivoting is only on a pocket of liquid and the only difference in operation for rotation one way or the other is that the pads tilt one way or the other to suit oil entering by whichever supply groove is on the leading edge whilst the other is not used.

What we claim as our invention and desire to secure by Letters Patent is:

1. A thrust bearing comprising
   an annular series of thrust pads
   each having a bearing surface for carrying thrust from a relatively rotating load surface and an opposed rear surface supported from the surface of a pad carrier,
   there being a first passage through the pad for supplying oil to the bearing surface of each pad;
   a pocket in the bearing surface of each pad;
   a recess at the center of the rear surface of each pad between the rear surface and the carrier surface; and
   a second passage leading through the pad from the pocket to the recess for leading oil pressurized hydrodynamically by rotation between the bearing surface and the load surface to act to support the pad from the carrier non-positively.

2. A bearing as defined in claim 1, including a source for the supply of pressurized lubricant to the surfaces of the pads, the source being in communication with an oil inlet in the working surface of each pad near the leading edge.

3. A bearing as defined in claim 2, in which the carrier has a rear surface supported from a carrier support, and including a passage leading the hydrodynamically pressurized oil to the space between the carrier rear surface and the carrier support surface.

4. A bearing as claimed in claim 1 in which the pads can tilt in relation to the carrier.

5. A bearing as claimed in claim 4 including means locating each pad laterally of the carrier surface with limited clearance.

6. A bearing as claimed in claim 1 in which the carrier rear surface and the carrier support surface are part-spherical.

7. A bearing as claimed in claim 1 in which the pad rear surfaces and the co-operating carrier surfaces are part-spherical.

* * * * *